United States Patent [19]

Williamson

[11] Patent Number: 4,792,082
[45] Date of Patent: Dec. 20, 1988

[54] ENCLOSED ANIMAL LITTER BOX

[76] Inventor: Gaylord L. Williamson, Box 349, Newell, S. Dak. 57760

[21] Appl. No.: 22,233

[22] Filed: Mar. 3, 1987

[51] Int. Cl.⁴ ........................ B65D 5/35; A01K 29/00
[52] U.S. Cl. .................. 229/103; 229/23 R; 229/8; 229/41 R; 119/1; 52/66
[58] Field of Search ...................... 229/103, 108, 41 R, 229/41 B, 23 R, 8; 52/66, 68, 69; 220/4 F; 493/52, 162; D30/1; 206/577; 119/1

[56] References Cited
U.S. PATENT DOCUMENTS

| 1,127,872 | 2/1915 | Duhan | 52/66 |
| 3,044,211 | 7/1962 | Palm | 229/8 |
| 3,184,146 | 5/1965 | Hurley | 229/108 |
| 3,581,708 | 6/1971 | Beck | 229/8 |
| 3,752,120 | 8/1973 | Pallesi | 119/1 |
| 3,849,952 | 11/1974 | Hanaoka | 52/69 |
| 4,014,292 | 3/1977 | Coughlin et al. | 229/41 R |
| 4,029,048 | 6/1977 | Gershbein | 119/1 |
| 4,272,009 | 6/1981 | Bamburg et al. | 229/41 R |
| 4,501,226 | 2/1985 | Bienvenu et al. | 119/1 |
| 4,624,380 | 11/1986 | Wernette | 229/41 R |

Primary Examiner—Willis Little
Attorney, Agent, or Firm—Merchant, Gould, Smith, Edell, Welter & Schmidt

[57] ABSTRACT

A litter box (1) including an outer front side wall (3), an outer rear side wall (4), an outer left side wall (5), a cover member (8), and an outer right side wall (6). The litter box (1) is formed from a single integral cardboard sheet (2) which, when folded in an appropriate fashion, results in an enclosed, disposable litterbox. The box (1) may be shipped with a supply of litter enclosed, and may be shipped and stored in a rectangular package of approximately 2 inches in height.

1 Claim, 3 Drawing Sheets

ENCLOSED ANIMAL LITTER BOX

BACKGROUND OF THE INVENTION

1. Field of the Invention

The present invention relates generally to the field of animal waste disposal. In particular, the present invention is directed towards an enclosed box structure which contains several features permitting the storage and shipment of litter within the box until needed, a removable cover which will allow the box to be placed in service for a short period of time and then disposed of in its entirety, to be replaced by another unit of the present invention.

2. Description of Related Technology

Many pet owners desire to keep their pet confined within their homes. Such confinement prevents the pet from disposing of its body waste in a natural manner out of doors. The solution to this problem is either to take the pet outside at occasional intervals, or to provide some mechanism within the house for disposing of animal waste. The latter option becomes a necessity if the pet is to be left unattended for long periods of time.

Some pets, particularly cats, can be trained to use a litter box with little or no difficulty. A typical litter box generally consists of a rectangular container, approximately one foot wide, two feet long, and four or five inches high. Placed within the box is a layer of sand or other absorbent material, typically in a layer two to three inches deep, so that the pet is able to freely enter the box, and dispose of and covers its body waste.

The use of litter boxes has become very widespread, but such use still suffers from the drawback that the litter box must be cleaned approximately every week, a process that requires that the spent litter material be removed, the box cleaned, and new litter placed within the box. The cleaning process itself is time consuming, tends to distribute fine particles of dust in the air during the emptying and refilling processes, and requires the use of considerable care to avoid inadvertently spilling litter.

Many ingenious devices have been developed over the years in order to simplify the maintenance of the litter box. Most of these devices include trays, multiple layered litter box floors, or other mechanical devices in order to simplify the litter emptying and refilling process. For example, U.S. Pat. No. 4,164,314, issued to Edgar, discloses a disposable litter box. The box is constructed of corrugated paper and is formed into a six-sided box which is shipped containing a flexible bag containing litter.

U.S. Pat. No. 4,299,190, issued to Rhodes, discloses a litter box containing a plastic garbage bag which may be removed periodically and replaced with another bag containing litter.

U.S. Pat. No. 4,522,150, issued to Gershman, discloses a housing which is clamped to a litter tray which may be periodically removed. A removable drawing having a screen bottom is mounted within the housing, the particulate litter dropping through the screen, the litter being separated so as to fall into a litter tray for reuse.

U.S. Pat. No. 4,540,360, issued to Higgins, discloses a disposable litter box being formed substantially as a rectangular solid. A removable cover exposes the litter to use, the cover retaining the litter within the box during shipment.

Finally, U.S. Pat. No. 4,553,671, issued to Cheesman, discloses a disposable cat litter container having the animal litter prepackaged within the container. The container is formed from a single integrated piece of paperboard material with the exception of a separate cover for retaining the litter within the box. A major drawback to the prior art devices discussed is that the minimum dimensions of the box when in its storing and shipping configuration are still unacceptably large. Since the box must have some depth to provide adequate cover for animal waste material, the prior art boxes have a side wall that is typically four or five inches in height, the side wall defining the minimum dimension which the box can assume during shipping and storage.

All of these prior art devices suffer from the drawback that either the litter box maintenance process is still time consuming insofar as the parent litter box structure remains permanently in the house and must, therefore, be cleaned periodically with a disinfectant solution even though the litter itself may have been changed in a relatively simple and straightforward manner, or the box is not sufficiently elementary in design to permit rapid and predictable erection of the structure.

SUMMARY OF THE INVENTION

The animal litter box according to the present invention represents an improvement over the prior art in that it is completely disposable, is substantially enclosed once erected, is completely sealed during shipment and storage, does not require that the pet owner to ever come into contact with the litter of the interior of the litter box, and when in need of replacement, the litter box can be disposed of in its entirety and replaced with another litter box. The present invention may be produced in commercial quantities at a cost which is at or below the cost involved in maintaining a conventional animal litter box.

The present invention may be constructed of a single sheet of a paperboard product, such as cardboard, and by a series of perforations, folds and cutouts may be formed readily into the final configuration of an animal litter box. In the preferred embodiment, the animal litter box is approximately 16 inches long, 14 inches wide, and 16 inches high.

The litter box according to the present invention has three basic components: a bottom section, a top section, and litter. The bottom section is basically an open rectangular box similar to conventional litter box and within which the litter is placed. The top section, which is formed integrally with the bottom section, is an enclosure which fits snugly over the bottom section and confines the litter within the bottom section when, for example, the litter is disturbed by an animal using the litter box. During manufacturing, once the basic box structure has been completed, the litter is placed in the bottom section. Next, the top section, which is part of the parent sheet of cardboard forming the entire litter box, is folded over the bottom section and some portions of the top section are recessed somewhat within the bottom section, thereby forming a completely sealed litter container suitable for shipping or storage.

The top section may be folded to form a plurality of generally rectangular sheets which are sized to fit securely into the upper portion of the bottom section. Substantially trapezoidal portions of the bottom section are compatibly shaped so that when the litter box is placed in use, the trapezoidal portions may be erected, thereby supporting the enclosure forward by the top section and exposing the litter for use by the animal. The upright portion of the top section extends approximately 16 inches from the lowermost portion of the bottom section inwardly towards the apex of a triangular elevation, thereby forming a peaked roof support which supports the top section and which tends to aid in the confinement of the litter within the box when disturbed by the animal.

DESCRIPTION OF THE PREFERRED EMBODIMENTS

Figure 1:
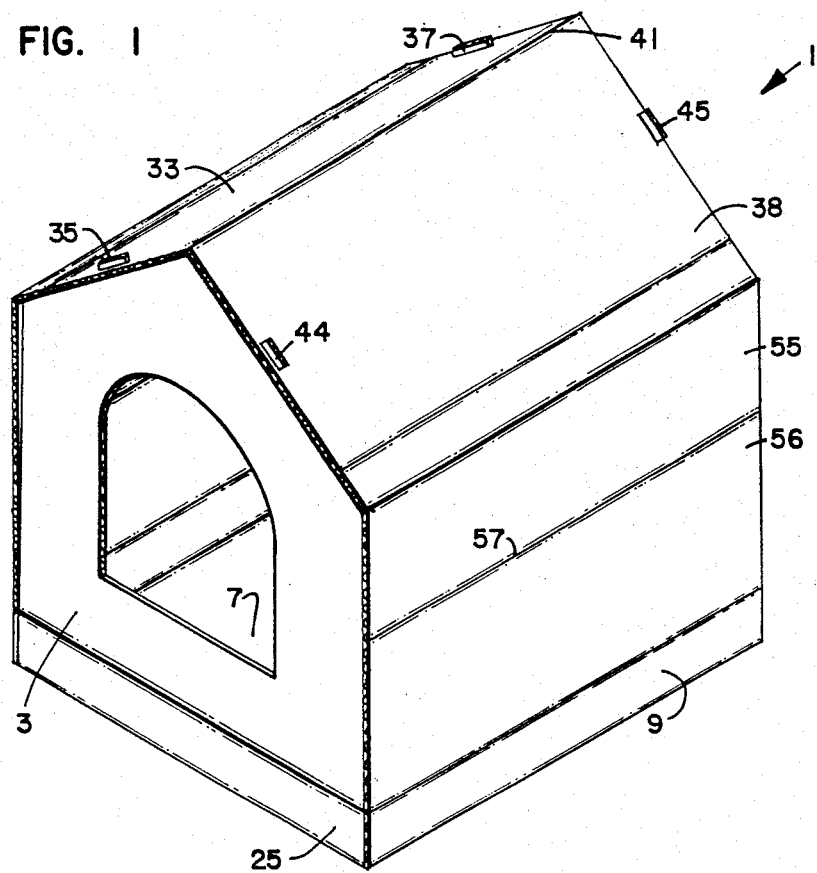
FIG. 1 is a perspective view of an animal litter box according to the present invention.
Figure 2:
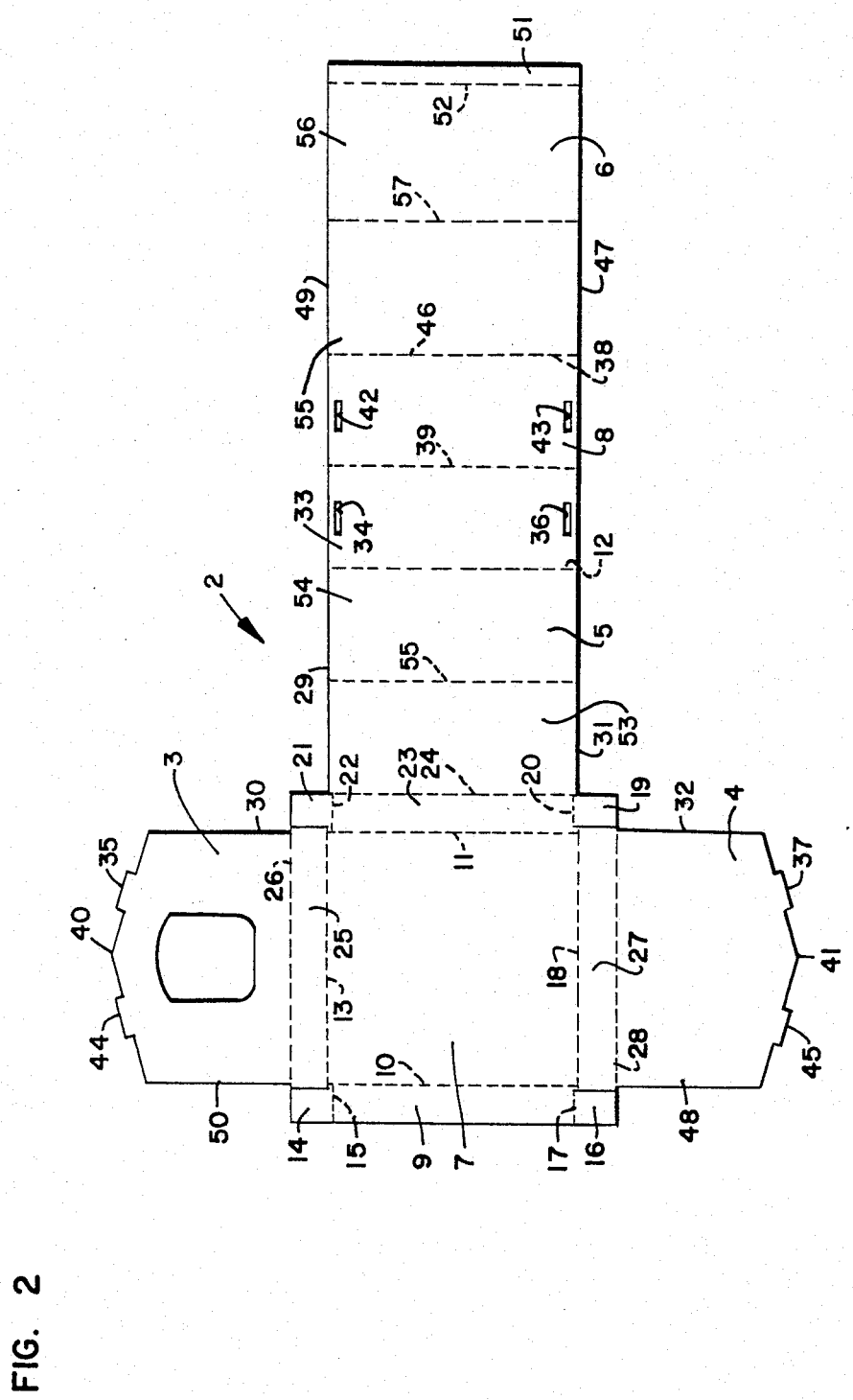
FIG. 2 is a view in top plan of the parent sheet from which the litter box as shown in FIG. 1 is formed.
Figure 4:
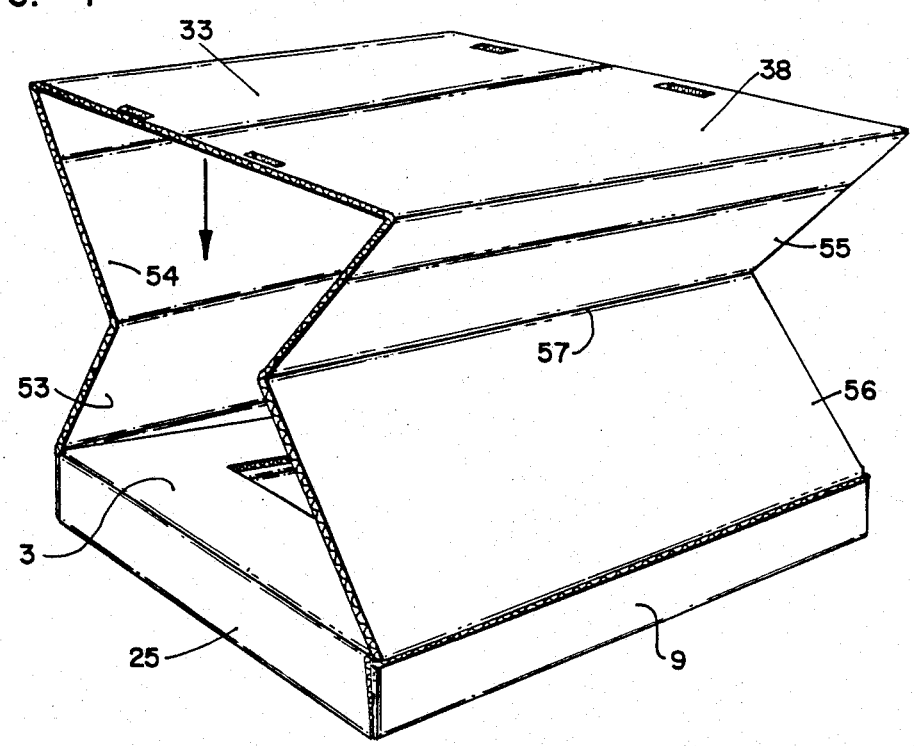
FIG. 4 is a perspective view of the animal litter box as shown in FIG. 1, depicted in a partially erected state.

Referring primarily to FIG. 1, the animal litter box shown generally at 1 is a first exemplary embodiment of the principles of the present invention, in which a cardboard sheet 2, as shown in FIG. 2, is used to form the side walls and interior structural members of a litter box. The litter box 1 includes an outer front side wall 3, an outer rear side wall 4, an outer left side wall 5, a cover member 8, and an outer right side wall 6. The bottom 7 joins to bottom 7 at right flap 9, flap 9 being integrally formed with bottom 7 along left intersection line 10.

As can best be seen in FIG. 2, litter box 1 is formed from sheet 2. The sheet is of a material such as cardboard, being lightweight, inexpensive, foldable, and relatively durable within the packing, shipping, and household environment. Initially, sheet 2 has dimensions of approximately 58 inches in length by 47 inches in width.

The construction of the box 1 begins by cutting sheet 2 into the configuration shown in FIG. 2. Intersection line 11 exists between left side wall 5 and bottom 7. Intersection line 11 represents a fold or crease line, thereby permitting panel 5 to be folded such that the angle between left side wall 5 and bottom 7 approximates 90 degrees, as shown in FIG. 1. Intersection line 13 is the line between bottom 7 and front side wall 3. During construction of litter box 1, line 13 serves as a fold line permitting front side wall 3 to be folded such that it is substantially perpendicular to bottom 7, as shown in FIGS. 1 and 2. Note in FIG. 2 the configuration of corner panel 14, which resides between right flap 9 and front side wall 3. Corner panel 14 is integrally formed with right flap 9 along intersection line 15, thereby permitting corner panel 14 to be folded perpendicularly with respect to right flap 9. When panels 3 and 9 are folded upwardly to form box 1, corner panel 14 is deflected inwardly such that panel 14 and front side wall 3 are forced into a layered relationship, with corner panel 14 and front side wall 3 stacked in parallel, adjacent planes substantially perpendicular to bottom 7. Panels 3 and 14 are also substantially perpendicular, in their final configuration, to right flap 9.

Intersection line 10 defines the line of intersection between bottom 7 and right flap 9. Intersection line 13 permits right flap 9 to be folded substantially perpendicular to bottom 7 as shown in FIGS. 1 and 2. Corner panel 16 resides between right flap 9 and read side wall 4, and is integrally formed with right flap 9 along intersection line 17. When right flap 9 is folded such that it is substantially perpendicular to bottom 7, line 17 permits deflection of corner panel 6 inwardly such that corner panel 16 assumes a layered relationship with rear side wall 4, the two panels 16 and 4 being substantially perpendicular to right flap 9.

Intersection line 18 permits rear side wall 4 to be folded substantially perpendicular to bottom 7 as shown in FIGS. 1 and 2. Left rear corner panel 19 resides between rear side wall 4 and 5 and is formed integrally with left side wall 5 along intersection wall 20. When rear side wall 4 is folded such that it is substantially perpendicular to bottom 7, line 19 permits deflection inwardly such that corner panel 19 assume a layered relationship with rear wall 4, the two panels 4 and 19 being substantially perpendicular to left side wall 5.

Similarly, left front corner panel 21 resides between front side wall 3 and left side wall 5 and is integrally formed with left side wall 5 along intersection line 22. As panels 3 and 5 are folded so as to be substantially perpendicular to bottom 7, line 22 permits deflection inwardly such that left front corner panel 22 assumes a layered relationship with front panel 3, the two panels 21 and 3 being substantially perpendicular to left side wall 5.

Figure 3:
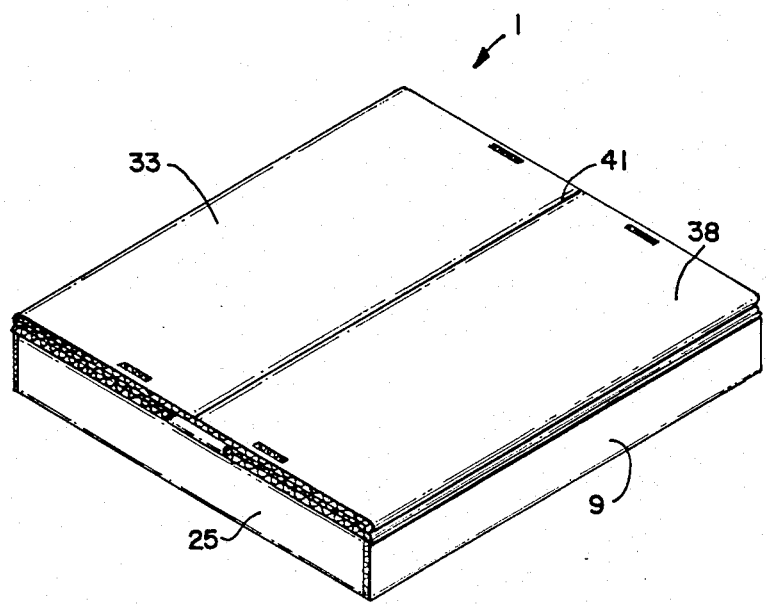
FIG. 3 is a perspective view of the litter box as shown in FIG. 1 in its storage and shipping configuration.

The next step in erecting a litter box according to the present invention is the correct placement of the left and right side panels, 5 and 6. First, left panel 5 is folded along intersection line 11 such that it resides in a plane that is substantially perpendicular to the plane occupied by bottom panel 7. A small crease zone 23, typically having a width of two inches, resides between the intersection line 11 of right side wall 5 and fold line 24. Crease zone 23 forms the right side wall of the litter box 1 when the litter box is in the storage and shipping configuration, as shown in FIG. 3.

Left side panel 5 is therefore perpendicular to bottom panel 7 when the box 1 is finally erected. Front side wall 3 is similarly folded along line 13 such that front panel 3 is perpendicular to bottom 7. A crease zone 25, having a width of approximately 2 inches, is defined in the region between fold line 13 and fold line 26, fold line 26 defining the line along which front panel 3 is folded during the shipping and storing configuration. In the shipping and storing configuration, front panel 3 is folded at an approximate 90 degree angle along line 26, this amount of deflection when added to the 90 degree bend of crease zone 25 in relation to bottom panel 7 along line 13, results in front panel 3 being substantially parallel to bottom 7. When the box 1 is finally erected, fron panel 3 is unfolded along line 26 such that front panel 3 is substantially perpendicular to bottom 7.

Rear panel 4 is folded along line 18 such that rear panel 4 is substantially perpendicular to bottom 7. A crease zone 27 resides between intersection line 18 and fold line 28, crease zone 27 typically having a width of approximately two inches. When box 1 is in the shipping and storing configuration, rear panel 4 is bent at an approximate 90 degree angle along fold line 28 which, when added to the 90 degree deflection along intersection line 18, results in rear panel 4 residing in a plane substantially parallel to bottom line 7. In this way, front panel 3 and rear panel 4 are in a stacked, layered relationship residing in a plane parallel to bottom 7 when the box is shipped and stored.

When the box is erected, therefore, front panel 3 and rear panel 4 have been folded along lines 13 and 18 respectfully, and reside in planes substantially perpendicular to bottom panel 7. Similarly, left side wall 5 is folded along intersection line 11 so that left side wall 5 is substantially perpendicular to bottom 7, the side wall 5 being supported along front edge 29 by the left edge 30 of front panel 3. Similarly, rear edge 31 of left side wall 5 is supported by left edge 32 of rear side wall 4.

Left roof panel 33 is then folded at an approximate 60 degree angle along intersection line 12 such that front orifice 34 engages tab 35 of front panel 3. Rear orifice 36 of left roof panel 33 engages tab 37 of rear side wall 4.

Right roof panel 38 is next folded at an approximate 30 degree angle along peak line 39, peak line 39 corresponding to roof peak point 40 on front panel 3 and roof peak point 41 on rear side wall 4. Orifice 42 then engages front tab 44 of front panel 3, while rear orifice 43 engages rear tab 45 which resides on rear panel 4.

Right side panel 6 is next bent at an approximate 60 degree angle along intersection line 46, thereby permitting the rear edge 47 of right side panel 6 to be supported by right edge 48 of rear panel 4, while front edge 49 of right side wall 6 is supported by right edge 50 of front side wall 3. Right flap 9 is folded upwardly at an approximately 90 degree angle along fold line 10 so as to engage end flap 51 of right side wall 6. End flap 51 is folded along line 52 to permit suitable engagement with right flap 9.

Corner panels 14, 21, 19, and 16 are folded into their appropriate positions during the erection process as earlier described.

When the box is initially manufactured, and is placed in its shipping and storing configuration, a suitable litter material is placed within a container which resides entirely within the region defined by bottom panel 7 and not exceeding the height of right flap 9, which is approximately two inches. During shipping, right flap 9 is folded along intersection line 10 at an approximate 90 degree angle, crease zone 25 is folded along line 13 in an approximate 90 degree angle, crease zone 23 is folded along line 11 at an approximate 90 degree angle, and crease zone 27 is folded along line 18 of an approximate 90 degree angle, as can best be seen in FIG. 3. The corner flap 14, 21, 19, and 16 assume the positions that they maintain once the box is finally erected, as previously ascribed. Also, front panel 3 is folded along line 26, and rear panel 4 is folded along line 28, such that panels 3 and 4 are parallel to and displaced approximately two inches above bottom panel 7. Prior to the folding of panels 3 and 4, left side panel 5, roof panel 8, and right side panel 6, are folded so as to reside within the volume defined by bottom panel 7, right flap 9, and crease zones 25, 23, and 27. This is accomplished by folding left side panel along crease line 24 at an approximate 90 degree angle, thereby causing lower portion 53 of left side panel 5 to reside in a plane approximately parallel to the plane of bottom 7. Next, upper portion 54 is folded approximately 180 degrees along perforation line 55 such that upper portion 54 assumes a stacked layered relationship with lower portion 53. Next, roof panel 8 is folded approximately 180 degrees along intersection line 12, thereby causing roof panel 8 to assume a stacked layered relationship with the upper and lower portions of left side panel 5. Right side panel 6 is then folded approximately 180 degrees along fold line 46 such that upper portion 55 resides in a plane parallel to that of bottom 7. Finally, lower portion 56 of right side panel 6 is folded approximately 180 degrees along perforation line 57 such that lower portion 56 assumes a stacked layered relationship with upper portion 55.

In this way, the final shipped container is an approximately rectangular box, having dimensions of 14 inches by 16 inches in length and width, and a height of approximately 2 inches. Such a box occupies substantially less volume than other disposable litter boxes known to the art.

I claim:

1. A method of constructing a box, comprising the steps of:
   (a) forming a sheet of a relatively stiff, foldable material into a substantially rectangular planform;
   (b) designating a substantially rectangular perimeter on the sheet so as to delineate a rectangular bottom member having an integrally adjacent front end flap, an integrally adjacent rear end flap, an integrally adjacent right side flap, an integrally adjacent left side flap, a roof panel, the roof panel being integrally formed between the right side flap and the left side flap, the roof panel being compatibly dimensioned so as to fit snugly along the front end flap and the rear end flap, the roof panel residing in at least one plane displaced somewhat above the bottom member, the front end flap, the rear end flap, the right side flap and the left side flap each possessing a substantially rectangular sheet-like extension, the sheetlike extensions serving as corner reinforcing members for the box, the sheet-like extensions adjacent to the left side flap and the right side flap being formed so as to have end tabs such that, after the sheet-like extensions are folded into the box so as to form the corner reinforcement members, the end tabs may be inserted into mating orifices within the roof panels so as to be parallel to the front end flap and the rear end flap, thereby securing the roof panel above the bottom member of the box;
   (c) folding the front end flap, the rear end flap, the right side flap, and the left side flap upwardly so as to form a four sided container having four corners, the corners being defined by an intersection of adjacent, abutting flaps, the roof panel being foldably inserted into the box after the front end flap, the rear end flap, the left side panel and the right side panel are folded inwardly so as to be enclosed within a volume defined by the crease zones and the bottom member;
   (d) securing each of the corners at the intersection so as to form a substantially rigid, permanently shaped container.

* * * * *